J. DINEEN.
ARTIFICIAL BAIT.
APPLICATION FILED APR. 19, 1911.
998,238.
Patented July 18, 1911.
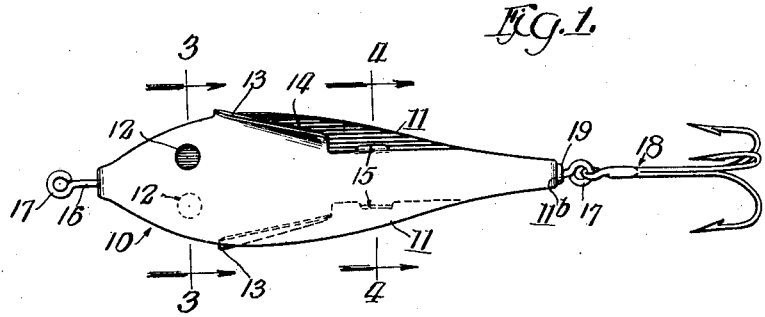
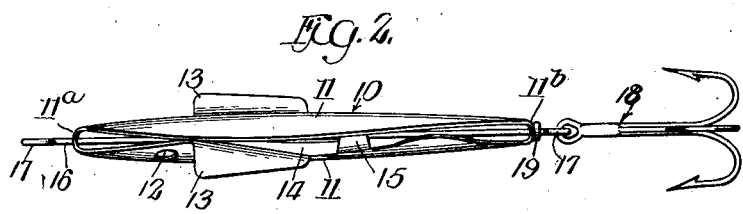
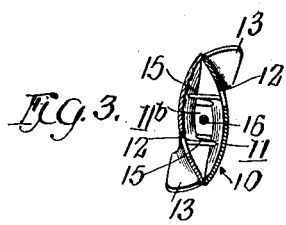
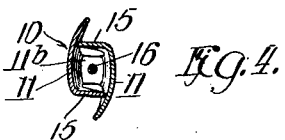
Witnesses:
Inventor
John Dineen
by Poole + Brown Attys
COLUMBIA PLANOGRAPH CO., WASHINGTON, D. C.

UNITED STATES PATENT OFFICE.

JOHN DINEEN, OF CHICAGO, ILLINOIS.

ARTIFICIAL BAIT.

998,238.  Specification of Letters Patent. Patented July 18, 1911.

Application filed April 19, 1911. Serial No. 621,970.

*To all whom it may concern:*

Be it known that I, JOHN DINEEN, a citizen of the United States, and a resident of Chicago, in the county of Cook and State of Illinois, have invented certain new and useful Improvements in Artificial Bait; and I do hereby declare that the following is a full, clear, and exact description thereof, reference being had to the accompanying drawings, and to the letters of reference marked thereon, which form a part of this specification.

This invention relates to an improvement in artificial bait and more particularly to an artificial minnow for use in fishing and consists of the matters hereinafter described and more particularly pointed out in the appended claim.

My improved bait is adapted for use in casting or trolling, and comprises a body constructed to simulate the appearance of a natural bait, in this case a minnow, the said body being provided with transversely curved, longitudinally extending vanes at or near the head thereof adapted to produce a rotary movement of the same when drawn through the water and a rod or stem extending longitudinally through said body which has rotative bearing thereon.
In the drawings:—Figure 1 is a view representing a side elevation of the improved minnow. Fig. 2 is a view representing a top plan view of the same. Fig. 3 is a view representing a cross-section through the body of the minnow on the line 3—3 of Fig. 1. Fig. 4 is a view representing a cross-section through the body on the line 4—4 of Fig. 1.

Referring now in detail to that embodiment of my invention shown in the drawings, 10 indicates the body of the minnow, which is constructed to have the appearance of a natural minnow. Said body is long and flat and comparatively wide at or near the head and tapers gradually toward the tail.
Said body is hollow and comprises transversely curved lateral members 11, 11, which are spaced from each other intermediate their lateral edges and approach each other toward said edges. These members are made of thin sheet metal, and as shown herein, are bent transversely at their ends to form end pieces 11ª, 11ᵇ, by means of which said members 11, 11 are secured together by solder or in any other convenient manner.
Each lateral member of the body is provided with a hole or opening 12 to give the effect of an eye, located in the head part near one edge thereof, the hole in one member being near one edge of the minnow body while the hole in the other member is near the other edge of said body.

Each lateral member is provided with a marginal projection which is bent outwardly to form an integral vane 13 at the rear of the eye-opening 12, said vanes being located on opposite edges of the minnow body and projecting in opposite directions therefrom. Each of said vanes 13 extends longitudinally and rearwardly at a slight angle to and away from the vertical plane between the metal plates comprising the minnow body, and is also inclined in a rearward direction toward the horizontal plane through the longitudinal axes of said plates. The inner edge of the vane meets the vertical plane through the central axis of the minnow at the forward end of the vane. An opening 14 is provided between the adjacent edges of the plates in the neighborhood of the vanes, the marginal edge of each plate being cut away at the rear of the vane to extend said opening, which tapers to nothing at the forward end of the vane and increasing to a maximum at its rear end, and is extended rearwardly beyond said vane. Each lateral member is preferably provided at a short distance at the rear of the vane 13 with an integral extension 15, which is bent substantially at right angles to said lateral member and abuts at its end against the other lateral member, said extensions thus serving to brace the lateral members of the minnow body apart.

16 indicates a rod or stem extending longitudinally through the minnow body and through apertures in the ends 11ª, 11ᵇ thereof. Said rod is bent upon itself to form eyelets 17, 17 at each end,—one at its forward end for attachment to a line or to a swivel connection secured to the line, and the other at its rear end for the attachment of a hook 18. The part of the rod or stem forming said eyelets also serves to retain the minnow on the said rod or stem. Preferably an antifriction ring 19 is interposed between the rear end 11ᵇ of the minnow body and the rear eyelet 17 to which the hook 18 is attached.

When my improved bait is drawn through the water, either in reeling in after casting or in trolling, the minnow body is caused to rotate rapidly on the rod or stem 16 by reason of the pressure of the water against the vanes 13. That part of the water against which the vanes rotate and which resists the rotary movements of said vanes slides with little resistance rearwardly in contact with the vanes and then passes through the openings 14, thus greatly reducing the resistance both to the rotation of the minnow body and to the dragging or pulling effort required in drawing said minnow through the water. By reason of the provision of said openings 14 only a small transverse component of the force of the water pressure against the vanes is required to make the minnow body rotate rapidly, thus making it possible to extend the vanes almost parallel to the longitudinal axis of the minnow body and thereby greatly reducing the force required to draw the minnow through the water while at the same time producing the necessary rapid rotation.

The rapid rotation of the minnow body in the water with the vanes located as described produces an effect greatly resembling the appearance of a natural minnow swimming through the water, the vanes by reason of their location and relative angular relation to the body producing in a side view of the bait an effect quite nearly simulating the appearance of the dorsal and ventral fins of a natural minnow.

The bait may be variously colored to suit the particular object that it is intended to represent. In the case of a minnow as herein described, the body is preferably made of bright, shiny metal, the inner sides of the lateral members being colored with some distinctive, attractive color as is usual with such bait.

While in describing one embodiment of my invention I have referred to certain mechanical details of construction and have herein shown it as applied in connection with a minnow body, it is to be understood that I do not limit myself thereby except in so far as may be pointed out in the appended claim.

I claim as my invention—

An artificial bait comprising a body member and a rod on which said body is rotatively mounted, said body member consisting of laterally spaced, transversely curved, elongated, thin, metal plates tapered toward their ends and secured together at said ends, each plate having a marginal projection bent outwardly to form a longitudinally extending, transversely curved vane, said vanes being located on opposite edges of the body, and being inclined in a rearward direction away from the plane between said plates and toward the longitudinal central axes thereof, and each plate being cut away at the rear of its connected vane to provide an opening between the marginal edges of said plates.

In testimony, that I, claim the foregoing as my invention I affix my signature in the presence of two witnesses, this 14th day of April, A. D. 1911.

JOHN DINEEN.

Witnesses:
 CLARENCE E. MEHLHOPE,
 GEORGE R. WILKINS.

---

Copies of this patent may be obtained for five cents each, by addressing the "Commissioner of Patents, Washington, D. C."